Patented July 30, 1940

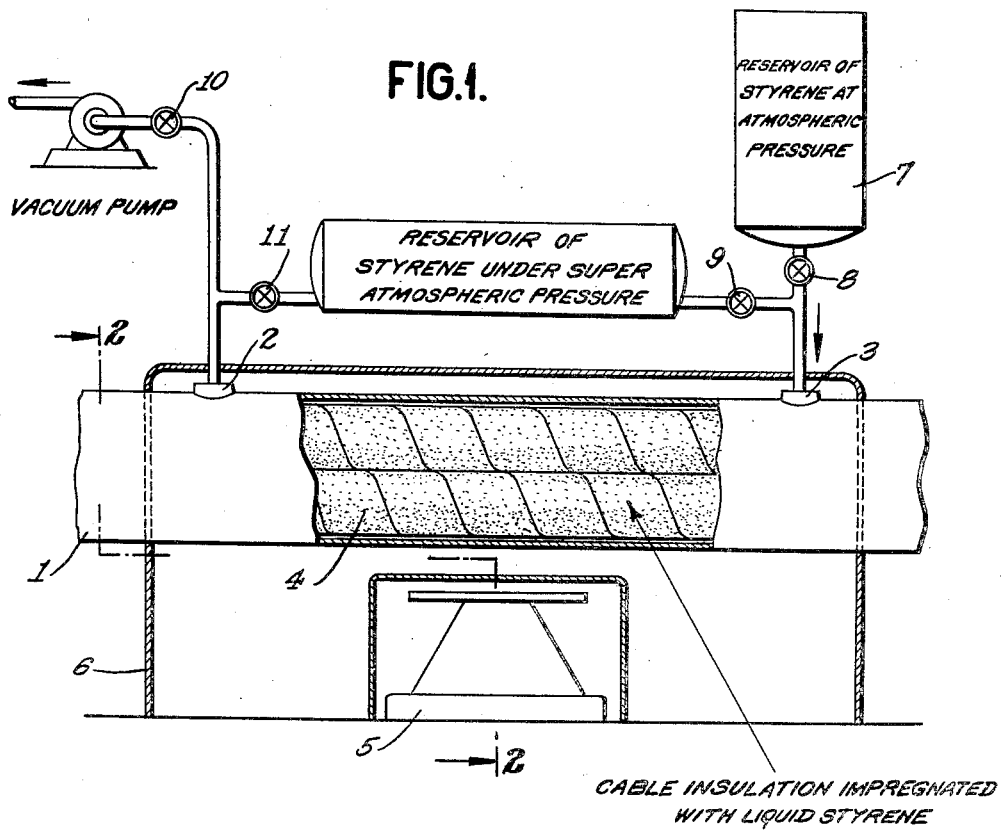
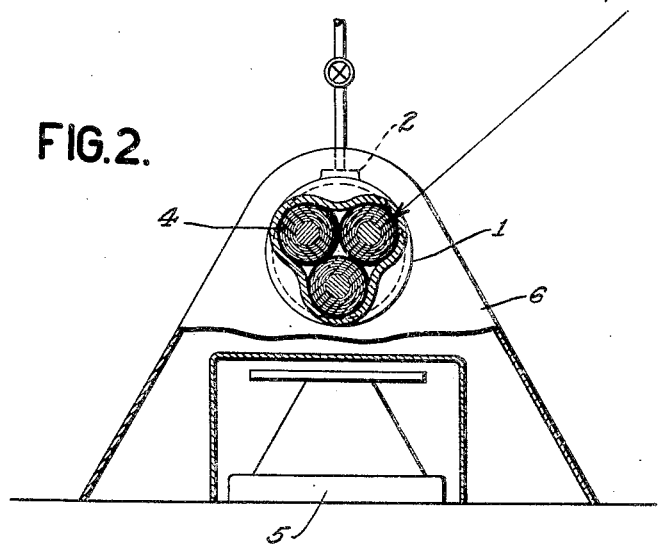

2,209,895

UNITED STATES PATENT OFFICE 2,209,895

ELECTRIC CABLE

John Krauss Webb, London, England, assignor to International Standard Electric Corporation, New York, N. Y.

Application March 5, 1936, Serial No. 67,308
In Great Britain July 19, 1935

9 Claims. (Cl. 174—23)

This invention is for improvements in or relating to electric power cables of the type comprising porous insulation, usually paper, impregnated with oil insulating compound, and has for its object to provide a method of inserting oil resisting barriers in such cables at any desired point or points therein. Usually the provision of such barriers is restricted to location at joints or terminations in the cable, but the present invention provides a method which enables barriers to be inserted at existing joints or at any intermediate point or at the termination of a cable.

This application is a continuation in part of my copending application Serial No. 745,931 which has issued as Patent No. 2,105,567.

According to the present invention, a polymerisable material such as liquid stryrene is introduced into the cable insulation by means of tappings or openings in the cable sheath and the material is then polymerised in situ to form a solid barrier in the cable.

In applying the method, styrene is fed to one opening under pressure in excess of that existing at the other opening, so that some of the oil in the cable between the openings is replaced by styrene. Heat may be applied to the cable between the openings to render the oil fluid and subsequently to polymerise the styrene.

The invention will be better understood from the following description of a preferred method of carrying the invention into effect taken in conjunction with the accompanying drawing in which Fig. 1 is a longitudinal section of a three core cable incorporating a barrier according to the invention and Fig. 2 is a cross-section along line 2—2 of Fig. 1.

It has been found possible according to the invention by inserting nipples in the lead sheath of a cable and causing a flow of styrene from one nipple to the other to replace a certain volume of oil with styrene. When this has been polymerised by heating, a barrier to the flow of oil along the cable is formed, and if the process is properly carried out, the electric strength of the cable does not suffer deterioration.

In forming a barrier according to the invention the cable sheath 1 is tapped and nipples 2, 3 are inserted at least one foot, but preferably about three feet apart. The lead sheath between the nipples is swaged down tightly on to the cable insulation 4, as shown in Fig. 2, to ensure that the styrene subsequently introduced will pass through the insulation and not merely escape through the space between the insulation and the sheath. The cable sheath between the nipples is heated to about 120° C. by means of heater 5 which is inside of heat insulating housing 6 surrounding the cable 1 so as to render the oil in the cable fluid. The styrene to be used must be thin and freshly distilled and it may be used pure or mixed with some plasticiser, such as diphenyl.

The styrene is introduced into nipple 3 under atmospheric pressure from reservoir 7 and is drawn through to the other, 2, by applying vacuum to the latter. In so doing an amount of oil is withdrawn from the cable which is replaced by styrene. When sufficient oil has been replaced in this way, styrene is forced into both nipples under pressure from reservoir 8, an air pressure of about 40 lbs. sq. inch having been found satisfactory. The temperature of the sheath being maintained at about 120° C. between the nipples, polymerisation will result in due course, and a barrier will be formed in the cable. The styrene being forced in during polymerisation serves to compensate for contraction on polymerisation. Reference numerals 8, 9, 10 and 11 indicate control valves.

The process above described is also applicable to the case of cable ends without modification except that in certain cases the end of the cable itself may provide one of the openings so that it would only be necessary to provide a tapping into the sheath at a suitable distance from the open end of the cable.

The method may also be applied to an existing cable joint to convert a straight-through type of joint to a barrier joint. Thus, the tappings could be provided in the cable sheath at each side of the joint or in the ends of the lead sleeve covering the joint, with if desired an additional tapping at the centre of the joint and styrene introduced as previously described to impregnate the existing oil impregnated paper tapes of the joint. Alternatively the paper tapes around the joint may have been impregnated in styrene and the process may be used to effect a firm bond between the jointing tapes and the cable insulation.

The term "styrene" used in this specification and claims is intended to include pure styrene or a mixture of styrene and some suitable plasticiser such as diphenyl or its derivatives.

What is claimed is:

1. A method of providing an oil resisting barrier or termination in a metal sheathed oil impregnated cable without removing the original oil impregnated insulation therefrom which consists in introducing a polymerisable material such as liquid styrene into the original oil impregnated cable insulation by means of tappings or openings in the metal sheath and applying heat to the cable between the openings to render the oil fluid and to subsequently polymerise the material.

2. A method of providing an oil resisting barrier or termination in a metal sheathed oil impregnated cable without removing the original oil impregnated insulation therefrom which consists in providing tappings or openings in the metal sheath, applying liquid polymerizable material such as liquid styrene to one opening under pressure in excess of that existing at another opening so that some of the oil in the original insulation of the cable between the openings is replaced thereby and thereafter polymerizing the material to form an oil tight barrier in said cable while forcing some of the polymerizable material into said opening under pressure during the polymerization to compensate for contraction upon polymerization.

3. A method of providing an oil resisting termination in a metal sheathed oil impregnated cable without removing the original oil impregnated insulation therefrom which consists in introducing polymerisable material such as liquid styrene into the original oil impregnated cable insulation through an opening near said termination in excess of the pressure existing at the termination whereby the oil in the original insulation of the cable between said opening and termination is replaced thereby and thereafter polymerising the material to form a barrier in the cable.

4. A metal sheath electric cable having continuous, uninterrupted, uniform porous insulation, a section of which is impregnated with polymerized styrene forming an oil tight barrier, the remaining portion of said insulation being impregnated with oil.

5. A method of providing an oil resisting barrier or termination in a metal sheathed oil impregnated cable without removing the original oil impregnated insulation therefrom which comprises providing tappings or openings in the sheath between which the original oil impregnated insulation exists, applying liquid polymerisable material such as liquid styrene to one opening under pressure in excess of that existing at another opening so that some of the oil in the original insulation of the cable between the openings is replaced by said liquid polymerisable material and thereafter polymerizing the latter to form an oil tight barrier in said cable.

6. A method in accordance with claim 5 wherein heat is applied to the cable between said openings to render the oil in said cable fluid.

7. A method in accordance with claim 5 wherein said cable sheath between said openings is swaged down tightly on to the cable insulation to ensure the liquid polymerisable material subsequently introduced will pass through said insulation and not merely escape through the space between the cable sheath and insulation.

8. A method of providing an oil resisting barrier or termination in a metal sheathed oil impregnated cable without removing the original oil impregnated insulation therefrom which comprises providing tappings or openings in the sheath between which the original oil impregnated insulation exists, applying thin freshly distilled styrene to one opening under pressure in excess of that existing at another opening so that some of the oil in the original insulation of the cable between the openings is replaced by said styrene and thereafter polymerising the latter to form an oil tight barrier in said cable.

9. A method of providing an oil resisting barrier or termination in a metal sheathed oil impregnated cable without removing the original oil impregnated insulation therefrom which comprises providing tappings or openings in the sheath between which the original oil impregnated insulation exists, swaging the cable sheath between said openings tightly down on to said cable insulation, applying heat to the cable between said openings to render the oil in said cable fluid, applying thin freshly distilled styrene to one opening under pressure in excess of that existing at another opening so that some of the oil in the original insulation of the cable between the openings is replaced by said styrene and thereafter polymerizing the latter under pressure to form an oil tight barrier in said cable.

JOHN KRAUSS WEBB.